Figure 1:
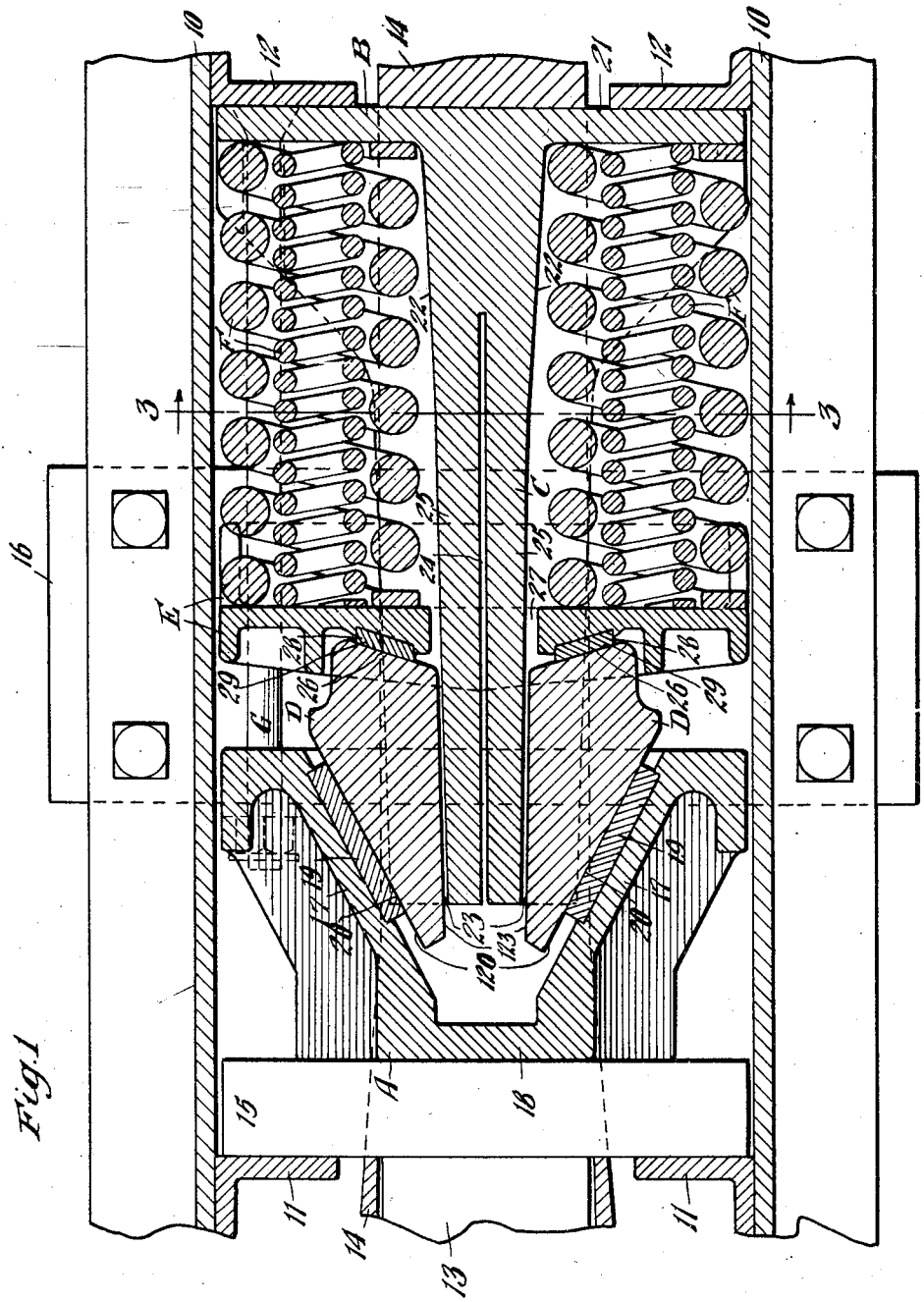

Oct. 30, 1928.  1,689,449
J. F. O'CONNOR
FRICTION SHOCK ABSORBING MECHANISM
Original Filed Jan. 30, 1925   2 Sheets-Sheet 1

Witnesses
Wm. Geiger

Inventor
John F. O'Connor
By George I. Haight
His Atty.

Oct. 30, 1928.
J. F. O'CONNOR
1,689,449
FRICTION SHOCK ABSORBING MECHANISM
Original Filed Jan. 30, 1925  2 Sheets-Sheet 2
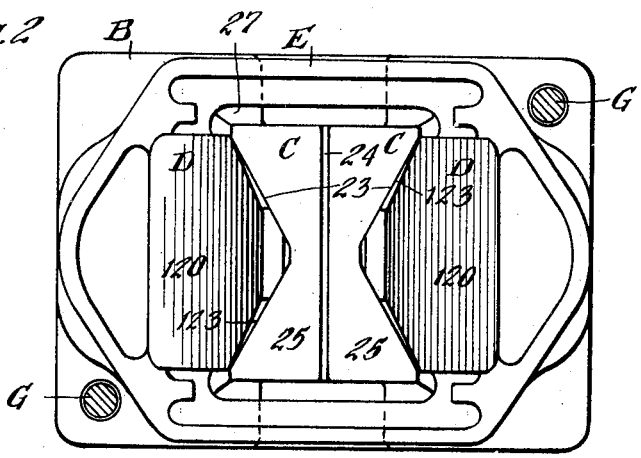
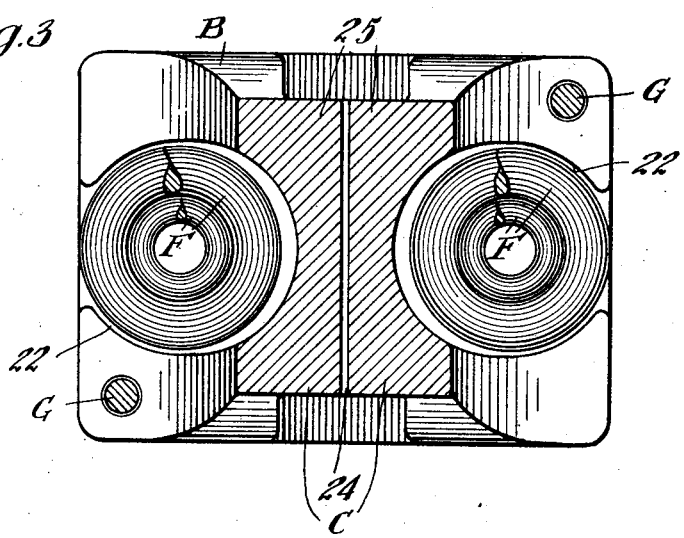
Witnesses
Wm. Geiger
Inventor
John F. O'Connor
By George J. Haight
His Atty.

Patented Oct. 30, 1928.

1,689,449

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 30, 1925, Serial No. 5,686. Renewed March 30, 1928.

This invention relates to improvements in friction shock absorbing mechanisms.

One object of the invention is to provide a friction shock absorbing mechanism especially adapted for railway draft riggings, wherein is obtained preliminary light capacity action followed by a high frictional capacity during the remainder of the compression stroke.

Another object of my invention is to provide a mechanism of the character indicated in the foregoing, wherein are employed a friction element and a spring resisted wedge friction system cooperating therewith, the friction element being compressible to a limited extent to provide light capacity action during the initial compression of the mechanism.

More specifically, an object of the invention is to provide a mechanism of the character indicated, wherein are employed a plurality of wedge friction shoes and a longitudinally disposed friction post with which the shoes cooperate, the post being longitudinally slotted to provide sections laterally yieldable to a limited extent to effect a light preliminary action during compression of the mechanism.

Other objects and advantages of the invention will more fully and clearly appear from the description and claims hereinafter following.

In the drawings, forming a part of this specification, Figure 1 is a horizontal, longitudinal, sectional view of a portion of a railway draft rigging, showing my improvements in connection therewith. Figure 2 is a front end, elevational view of the shock absorbing mechanism proper, with the front follower and wedge pressure transmitting element removed. And figure 3 is a vertical, transverse, sectional view, corresponding substantially to the line 3—3 of Figure 1.

In said drawings, 10—10 indicate channel-shaped center or draft sills, of a railway car underframe, to the inner faces of which are secured front stop lugs 11—11 and rear stop lugs 12—12 of usual construction. The inner end portion of the drawbar is indicated at 13, the same having operatively associated therewith a cast yoke 14 of well-known form within which is disposed a front follower 15 and the shock absorbing mechanism proper, hereinafter described. The yoke and the parts contained therein are supported in operative position by a detachable saddle plate 16.

The improved shock absorbing mechanism, as shown, comprises a front wedge casing A; a rear follower element B; a friction post C; a pair of friction wedge shoes D—D; a spring follower E; twin arranged main spring resistance elements F—F; and a pair of retainer bolts G—G.

The wedge casing A is of hollow construction having rearwardly diverging side walls 17—17, and a flat, transverse end wall 18 adapted to abut the inner surface of the front follower 15. The rearwardly diverging side walls 17—17 are provided with wear plates 19—19 presenting flat wedge surfaces 20—20 adapted to cooperate with the corresponding friction shoes. Although I have herein shown the casing A provided with wear plates, it will be evident that the surfaces of the side walls 17 may be formed so as to directly provide wedge faces.

The rear follower element B is of generally rectangular outline and has the friction post C formed integral therewith. The follower B is provided with a transverse rear wall 21 adapted to coact with the stop lugs 12.

The opposite sides of the post are cut away to correspond to the curvature of the outer coils of the springs, thereby providing recesses 22 adapted to accommodate the same. The friction post C is provided with friction surfaces 23—23 on the opposite sides thereof, the post being tapered forwardly so that the friction surfaces 23 converge slightly toward the forward end of the mechanism. The post C is also vertically slotted for the major portion of its length as indicated at 24 thereby providing two spaced arms 25—25 which have a certain amount of resiliency. The slot 24 is made of a predetermined width, for a purpose hereinafter described.

In the normal position of the parts, the front end of the post is spaced from the inner face of the front wall of the follower A a distance equal to the compression stroke of the mechanism, so that movement of the follower will be arrested by engagement with the post when the mechanism is fully compressed.

The two friction shoes D, preferably in the form of castings, are of like construction, each having a flat inner friction surface 123 adapted to cooperate with the corresponding friction surface 23 of the post. At the outer side, each shoe is provided with a wedge face 120 correspondingly inclined to and adapted to cooperate with the wedge faces 20 of the follower A at the same side of the mechanism. The inner end of each friction shoe is inclined outwardly as indicated at 26.

The spring follower E is in the form of a heavy, rectangular plate having vertically disposed reinforcing ribs and horizontally disposed reinforcing flanges at the forward side thereof, the horizontally disposed flanges extending along the top and bottom edges of the follower plate. The follower plate E is also provided with a central opening 27 adapted to freely accommodate the friction post therein, the opening being of sufficient size to prevent contact with the diverging faces of the post when the mechanism is fully compressed and the follower is in the rearmost position. Wear plates 28—28 are disposed in opposite sides of the opening of the follower, the same being seated in suitable recesses provided in the front face of the same. The wear plates 28 are so disposed that the outer surfaces 29 thereof are correspondingly inclined to the surfaces 26 of the friction shoes D.

The twin arranged springs F are interposed between the spring follower F and the traverse end wall 21 of the rear follower B, the same being arranged on opposite sides of the friction post. Each spring element preferably comprises an inner, relatively light coil and an outer heavier coil.

The mechanism is held under initial compression and of uniform overall length by the retainer bolts G, two of such bolts being preferably employed, the same being arranged at diagonally opposite corners of the mechanism and having their front and rear ends anchored respectively to the followers A and B.

The operation of the device is as follows, assuming a compression stroke of the mechanism. As the front follower A is forced inwardly, the shoes D will be wedged inwardly against the friction post C, forcing the arms 25 thereof toward each other until movement of the same is limited by engagement of the arms with each other. It will be evident that a light preliminary action is thus provided, during which on account of the yielding nature of the post little or no relative movement between the shoes and follower A will be effected, due to the tapered friction surfaces of the post, resulting in "differential action." Relative movement of the shoes and follower will not be effected until the arms 25 are in abutment. It is pointed out that the inner surfaces 123 of the shoes are so disposed that there will be no true flat contact of these surfaces and the surfaces 23 of the post during the transition period, or until the arms 25 come into abutting relation and become parallel for some distance from their ends. By this arrangement, the maximum area of frictional contact between the shoes and post is assured during inward movement of the shoes on the post and during preliminary action. After the initial action just described, upon further inward movement of the front follower A, the friction shoes D will be forced to slide inwardly on the friction surfaces of the post against the resistance of the main springs F, thereby greatly augmenting the resistance offered. During the rearward movement of the shoes on the post, the former will be forced to move inwardly at a greater rate than the main follower A, due to the diverging relation of the post friction surfaces, effecting an additional compression of the main springs and also a slight relative movement of the coacting wedge faces of the shoes and main follower. This action will continue until the actuating force is reduced, or the front end of the post is engaged by the inner face of the front wall of the main follower A, thereby arresting movement of the follower, the actuating force then being transmitted through the post directly to the rear follower and the rear stop lugs 12.

Upon reduction of the actuating force, the main springs F will return the wedge shoes and main follower to normal position, outward movement of the latter being positively limited by the retainer bolts G. As soon as the wedging pressure is reduced, due to the inherent resiliency of the arms 25 of the post, the same will also return to their normal, spaced position.

From the preceding description taken in connection with the drawings, it will be evident that I have provided an exceptionally simple and efficient gear having relatively light capacity during initial compression and relatively greater resistance during the remainder of the compression stroke. By this arrangement, a gear is provided which is particularly suited for passenger car service.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a longitudinally disposed friction element, said element being laterally yieldable and compressible to an appreciable extent to provide for preliminary action; of a plurality of wedge friction shoes cooperating with said element; a main spring resistance for said shoes; and wedge pressure transmitting means cooperating with said shoes.

2. In a friction shock absorbing mechanism, the combination with a column element including yieldingly supported members, relatively displaceable toward each other to a limited extent to provide for preliminary action, said members having longitudinally disposed friction surfaces; a friction wedge system including a plurality of friction shoes having friction surfaces cooperating with the friction surfaces of said element; a main spring resistance; and pressure transmitting means cooperating with said wedge friction system.

3. In a friction shock absorbing mechanism, the combination with a friction wedge system including friction shoes; a friction element with which said shoes cooperate, said element being of a yieldable character and compressible to a predetermined extent to provide for preliminary action; and means for yieldingly opposing movement of said friction shoes.

4. In a friction shock absorbing mechanism, the combination with a laterally compressible friction element composed of a plurality of laterally movable sections adapted to yield to provide for preliminary action; of a plurality of friction shoes cooperating with said element; a spring resistance; and a pressure transmitting means cooperating with said shoes, said shoes and pressure transmitting means having coacting wedge faces.

5. In a friction shock absorbing mechanism, the combination with front and rear follower acting members; of a sectional friction post associated with one of said followers, the sections of said post being relatively displaceable toward each other and yieldingly supported to provide for preliminary action; a plurality of friction shoes cooperating with the post sections; a main spring resistance coacting with the shoes; and wedge pressure transmitting means engaging the shoes.

6. In a friction shock absorbing mechanism, the combination with a central friction element having yielding arms provided with longitudinally diverging friction surfaces, said arms being displaceable to a limited extent to provide for preliminary action; of a spring resistance; a plurality of friction elements cooperating with said friction surfaces; and a pressure transmitting wedge means cooperating with said last named elements.

7. In a friction shock absorbing mechanism, the combination with a front follower having interior wedge faces; of a rear follower member provided with an integral friction post, said post being longitudinally slotted to permit compression thereof to a limited extent; a plurality of friction shoes cooperating with the post, said shoes being provided with wedge faces coacting with the wedge faces of the follower; and means for yieldingly resisting inward movement of said shoes.

8. In a friction shock absorbing mechanism, the combination with a follower having wedge means associated therewith; of a friction element, including a pair of resiliently supported, laterally displaceable, spaced arms adapted to abut to limit the lateral displacement thereof when subjected to a predetermined pressure, said arms having longitudinally disposed friction surfaces; a spring resistance; and a plurality of friction shoes, each shoe cooperating with a friction surface of said element and the corresponding wedge means associated with the follower.

9. In a friction shock absorbing mechanism, the combination with wedge pressure transmitting means; of friction shoes adapted to be forced laterally by said means; a friction element cooperating with said shoes, said element being laterally yieldable to a limited extent to provide for light preliminary action of the mechanism; and a main spring resistance cooperating with said shoes.

10. In a friction shock absorbing mechanism, the combination with two end members relatively movable toward and from each other; of wedge-acting elements movable with one of said members; means, movable with the other of said members, having friction surfaces extending in the same general direction as the line of relative movement between said members, said means being normally located in one position and yieldable in a direction transverse to said line movement upon application of pressure laterally thereagainst; wedge-friction elements interposed between said wedging means and said friction surfaces, and frictionally cooperable with the latter and relatively slidable thereon; and spring means for yieldingly resisting relative movement between said end members.

In witness that I claim the foregoing I have hereunto subscribed my name this 26th day of January, 1925.

JOHN F. O'CONNOR.